(12) United States Patent
Miura et al.

(10) Patent No.: US 11,024,898 B2
(45) Date of Patent: Jun. 1, 2021

(54) LITHIUM-ION BATTERY HIGH TEMPERATURE AGING PROCESS

(71) Applicants: TOYOTA MOTOR EUROPE, Brussels (BE); TOYOTA JIDOSHA KABUSHIKI KAISHA, Toyota (JP)

(72) Inventors: Takashi Miura, Brussels (BE); Stephane Cotte, Brussels (BE); Kitayoshi Masanori, Toyota (JP)

(73) Assignees: TOYOTA MOTOR EUROPE, Brussels (BE); TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 16/315,479

(22) PCT Filed: Feb. 22, 2017

(86) PCT No.: PCT/EP2017/054091
§ 371 (c)(1),
(2) Date: Jan. 4, 2019

(87) PCT Pub. No.: WO2018/153450
PCT Pub. Date: Aug. 30, 2018

(65) Prior Publication Data
US 2019/0363409 A1 Nov. 28, 2019

(51) Int. Cl.
*H01M 10/615* (2014.01)
*H01M 10/0525* (2010.01)
(Continued)

(52) U.S. Cl.
CPC ........... *H01M 10/615* (2015.04); *B60L 58/16* (2019.02); *B60L 58/27* (2019.02);
(Continued)

(58) Field of Classification Search
CPC ... H01M 10/44; H01M 10/446; H01M 10/615
See application file for complete search history.

(56) References Cited

U.S. PATENT DOCUMENTS

| 2012/0141869 A1 | 6/2012 | Takahata |
| 2015/0104701 A1 | 4/2015 | Azami |

FOREIGN PATENT DOCUMENTS

| JP | 2010-287512 A | 12/2010 |
| JP | 2016-35879 A | 3/2016 |

(Continued)

OTHER PUBLICATIONS

Tatsumisago, M., "Electrical Properties of Glass", New Glass, 2008, vol. 23, No. 2, pp. 46-53.
(Continued)

*Primary Examiner* — Stephan J Essex
(74) *Attorney, Agent, or Firm* — Sughrue Mion, PLLC

(57) ABSTRACT

A method of performing a high-temperature aging process of a rechargeable cell (10) comprising an anode (12), a cathode (16), an electrolyte (22) and a separator (20), is provided. The method includes heating a solid electrolyte interface (24) formed on the anode (12) to a predetermined temperature at which a saturated ionic conductivity of the solid electrolyte interface (24) is elevated, and holding the solid electrolyte interface (24) at the predetermined temperature for a predetermined minimum time at which ionic conductivity of the SEI becomes saturated.

12 Claims, 3 Drawing Sheets

(51) Int. Cl.
*H01M 10/44* (2006.01)
*B60L 58/27* (2019.01)
*B60L 58/16* (2019.01)

(52) U.S. Cl.
CPC ..... *H01M 10/0525* (2013.01); *H01M 10/446* (2013.01); *B60L 2240/36* (2013.01); *H01M 2220/20* (2013.01)

(56) References Cited

FOREIGN PATENT DOCUMENTS

| | | | |
|---|---|---|---|
| KR | 1020080087338 A | 10/2008 | |
| KR | 1020120061917 A | 6/2012 | |
| WO | 2011024250 A1 | 3/2011 | |
| WO | 2013150937 A1 | 10/2013 | |
| WO | WO-2015068017 A1 * | 5/2015 | ............ H01M 4/133 |
| WO | 2015/183557 A1 | 12/2015 | |
| WO | WO-2016070205 A2 * | 5/2016 | .......... H01M 10/058 |
| WO | 2016/141301 A1 | 9/2016 | |

OTHER PUBLICATIONS

Notice of Reasons for Rejection dated Feb. 25, 2020 from the Japanese Patent Office in application No. 2019-500549.
Notification of Reason for Refusal dated Mar. 30, 2020 from the Korean Intellectual Property Office in application No. 10-2019-7000654.
International Search Report for PCT/EP2017/054091 dated May 4, 2017 (PCT/ISA/210).
Written Opinion of the International Searching Authority for PCT/EP2017/054091 dated, May 4, 2017 (PCT/ISA/237).

* cited by examiner

LITHIUM-ION BATTERY HIGH TEMPERATURE AGING PROCESS

CROSS REFERENCE TO RELATED APPLICATIONS

This application is a National Stage of International Application No. PCT/EP2017/054091 filed Feb. 22, 2017.

FIELD OF THE DISCLOSURE

The present disclosure is related to rechargeable cells, in particular to lithium ion batteries or cells, and more particularly to an improved method of performing a high-temperature aging process of such batteries, especially after initially charging such batteries (SEI formation process).

BACKGROUND OF THE DISCLOSURE

Lithium-ion batteries are part of a family of rechargeable battery types in which lithium ions move from the negative electrode to the positive electrode during discharge and from the positive electrode to the negative electrode when charging.

There are various types of lithium-ion batteries. The anode comprises generally carbon and the cathode comprises a lithium compound. The anode and the cathode are separated by a separator made from a porous polymer, such as a micro-perforated plastic sheet, which allows ions to pass through. The anode, cathode and separator are immersed in an electrolyte.

Lithium-ion batteries are classified according to the cathode material.

Once the lithium-ion battery is assembled, before the battery is ready to be used, the lithium-ion battery may be put through at least one precisely controlled charge/discharge cycle to activate the working material. This step is called the formation process. This formation process may provide the initial full charge of the battery.

During the formation process, a solid electrolyte interface (SEI) is formed on the anode. The SEI formation is important for the lifetime of the lithium-ion battery or cell.

Methods for initial charging, i.e., for the formation process, of a lithium-ion battery have been proposed.

Typically, the battery is charged at a constant charge rate. The charge rate is also expressed as a C-rate, which represents a charge or a discharge rate equal to the capacity of a battery in one hour. It has been found that the SEI is desirably formed at small C-rate, which means that the initial charging is performed over an extended period of time. Indeed, fully charging a battery at a C-rate equal to C/5 would take approximately five hours. The battery is charged at a small C-rate up to the fully charged voltage of the battery in order for the SEI to form on the carbon anode during the first charge and then the battery is held constant at the fully charged voltage until the current drops below a threshold. The battery is then left to rest for two hours and is discharged at a small C-rate to a pre-set voltage, i.e., the discharge cut-off voltage. This formation process may be cycled at least once.

Additives have also been added to the electrolyte to improve the formation of the SEI and therefore enhancing the anode stability.

It is further known to perform a high temperature aging process of the battery after the formation process, in order to complete the battery.

JP 2010-287512 discloses a method of manufacturing a lithium ion secondary battery including assembling the lithium ion secondary battery having a nonaqueous electrolyte including lithium salt having a dicarboxylic acid group in a nonaqueous solvent, initially changing the lithium secondary battery, and applying aging processing of holding for 6-24 hours at the temperature of 50-60° C. to the lithium ion secondary battery after its initial charge.

JP 2016-035879 discloses a lithium ion battery including a positive electrode containing a lithium-containing transition metal composite oxide having manganese as transition metal, a negative electrode containing graphitizable carbon, and an electrolyte. The lithium ion battery is maintained in a predetermined temperature environment for 10-600 hours after having been charged up to 4.0-4.2 V.

SUMMARY OF THE DISCLOSURE

Currently, it remains desirable to reliably control the reduction of the resistance of the positive electrode and at the same time the increment of the capacity stability.

Therefore, according to embodiments of the present disclosure, a method of performing a high-temperature aging process of a rechargeable cell comprising an anode, a cathode, an electrolyte, and a separator, is provided. The method includes, heating a solid electrolyte interface formed on the anode to a predetermined temperature at which a saturated ionic conductivity of the solid electrolyte interface is elevated, and holding the solid electrolyte interface at the predetermined temperature for a predetermined minimum time at which ionic conductivity of the SEI becomes saturated.

The present method enables a high temperature aging to be carried out for a large number of cells at a desirable temperature and for an optimum time, thereby resulting in a high quality SEI so as to improve capacity retention. By correlating capacity retention to a given battery design, the present method enables a determination of the quality of the SEI, and thereby, the indicated capacity retention, without performing a time consuming step of a capacity retention test for each cell design.

The method may include charging the rechargeable cell prior to the heating, to cause formation of the solid electrolyte interface.

The method may include providing an SEI-forming additive selected from among an oxalate salt, an ethylene carbonate and a sulfone, to the electrolyte.

The method may be performed for completion of the lithium-ion cell after a first charging of the cell.

The ionic conductivity of the solid electrolyte interface may be calculated as $$\frac{\varepsilon_0 \times \varepsilon_{sei}}{R_{sei} \times C_{sei}} \text{ s/cm}$$

where $\varepsilon_0$ permittivity of a vacuum and has a value of $8.9 \times 10^{-14}$ F/cm, $\varepsilon_{sei}$ corresponds to a relative permittivity of the solid electrolyte interface and has a value of 10, and where $R_{sei}$ is a resistance of the solid electrolyte interface and $C_{sei}$ is a capacitance of the solid electrolyte interface, each of $R_{sei}$ and $C_{sei}$ being measured via electrochemical impedance spectroscopy.

The anode may be heated with a predetermined temperature which is greater than 30° C., and less than 100° C., in particular 60° C.

The predetermined minimum time may range between 30 min and 200 hours, particularly between 5 and 80 hours, for example, approximately 40 hours.

The method may include disassembling the cell and conducting an EIS analysis of the anode.

According to further embodiments of the present invention, a vehicle comprising a rechargeable cell as described herein may be provided.

It is intended that combinations of the above-described elements and those within the specification may be made, except where otherwise contradictory.

It is to be understood that both the foregoing general description and the following detailed description are exemplary and explanatory only and are not restrictive of the disclosure, as claimed.

The accompanying drawings, which are incorporated in and constitute a part of this specification, illustrate embodiments of the disclosure and together with the description, and serve to explain the principles thereof.

DESCRIPTION OF THE EMBODIMENTS

Reference will now be made in detail to exemplary embodiments of the disclosure, examples of which are illustrated in the accompanying drawings. Wherever possible, the same reference numbers will be used throughout the drawings to refer to the same or like parts.

Figure 1:
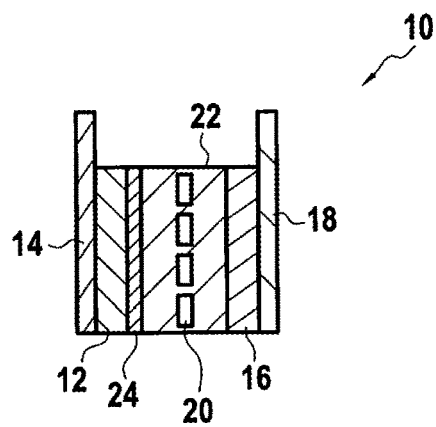
FIG. 1 shows a lithium ion cell.

FIG. 1 shows a schematic representation of an exemplary lithium ion cell 10. The lithium ion cell 10 includes an anode 12 fixed on an anode current collector 14 and a cathode 16 fixed on a cathode current collector 18. The anode 12 and the cathode 16 are separated by a separator 20, the anode 12, the cathode 16 and the separator 20 being immersed in an electrolyte 22.

The anode 12 may comprise a carbon based material, for example, graphite. The anode current collector 14 may comprise, for example, copper. The cathode 16 may comprise, for example, an intercalated lithium compound, e.g. LiNi1/3Co1/3Mn1/3O2. The cathode current collector 18 may comprise, for example, aluminium. The separator 20 may be made of a film comprising polyethylene.

The electrolyte 22 may be, for example, a mixture of ethylene carbonate, dimethyl carbonate and ethyl methyl carbonate present in equal volume ratio. The electrolyte may also comprise LiPF6 at 1 mol/L (mole/litre).

According to some embodiments of the disclosure, one or more SEI-forming additives may be added to the electrolyte 22 to aid in formation of a solid electrolyte interface (SEI) 24. The one or more SEI-forming additives may be selected from an oxalate salt, an ethylene carbonate and/or a sulfone.

Examples of oxalate salts may include lithium salts of:

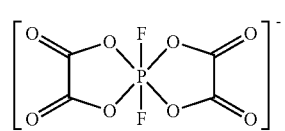

(1)

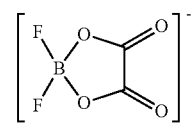

(2)

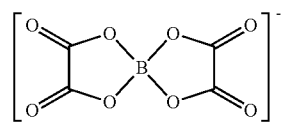

(3)

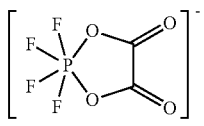

(4)

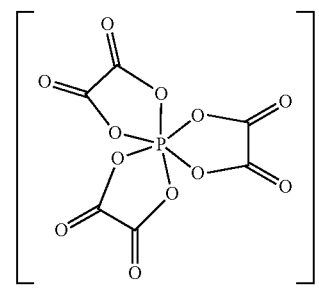

(5)

(1) is difluoro(oxalate)phosphate.

(2) is difluoro(oxalato)borate.

(3) is bis(oxalato)borate.

(4) is tetrafluoro(oxalato)phosphate.

(5) is tris(oxalato)phosphate.

Examples of ethylene carbonate may include:

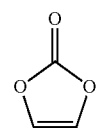

(6)

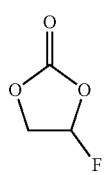

(7)

-continued

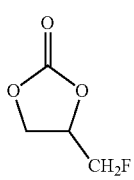
(8)

(6) is vinylene carbonate.
(7) is fluoroethylene carbonate.
(8) is (fluoromethyl)ethylene carbonate.
Examples of sulfone may include:

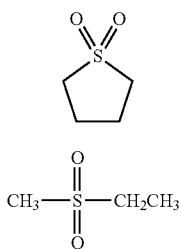
(9)

(10)
$$CH_3-\underset{\underset{O}{\|}}{\overset{\overset{O}{\|}}{S}}-CH_2CH_3$$

(9) is sulfolane.
(10) is ethyl methyl sulfone.

On the anode 12, a solid electrolyte interface 24 is formed during a formation process of the cell, i.e., during the initial charging of the cell 10. This means the SEI 24 is desirably formed before a high temperature aging process according to the present disclosure is carried out on cell 10.

SEI 24 may be formed from the SEI-forming additive, the electrolyte itself, or a combination thereof.

Figure 2:
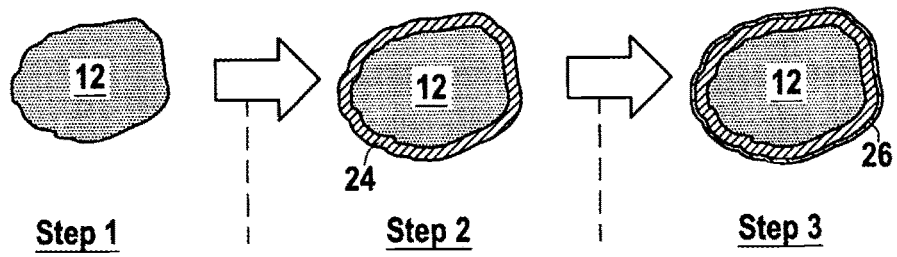
FIG. 2 shows a cross-section of an exemplary anode, and formation steps of a solid electrolyte interface portion thereon.

FIG. 2 shows a cross-section of an exemplary anode, and formation steps of a solid electrolyte interface portion thereon. Steps 1-3 are exemplary only, and may relate to various charge rates applied to rechargeable cell 10 during a formation process. In FIG. 2, SEI 24 corresponds to, for example, an SEI formed from an SEI-forming additive, while SEI 26 corresponds to an SEI formed form the electrolyte 22 itself. While these portions are shown individually in FIG. 2, it is to be understood that unless otherwise specified herein, SEI 24 refers collectively to the combination of SEI 24 and SEI 26, where the two exist together.

Figure 3A:
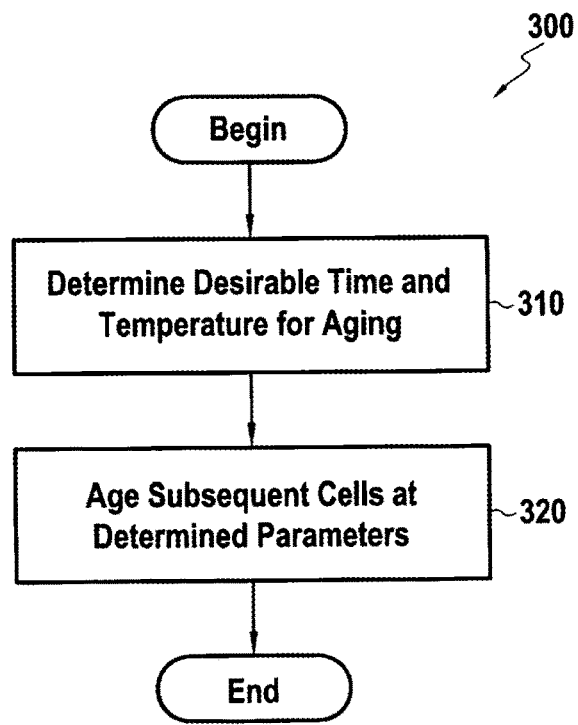
FIG. 3A shows a flowchart illustrating an exemplary method according to embodiments of the present disclosure.

FIG. 3A shows a flow chart illustrating an exemplary method according to embodiments of the present disclosure. This method is desirably carried out with test cells of the same cell type, in order evaluate for this cell type a suitable heating time and heating temperature in the high temperature aging process according to the disclosure. Once the parameters of a suitable heating time and heating temperature are known for the test cells, subsequent high temperature aging processes of regular cells of the same cell type may be controlled based on these parameters.

Figure 3B:
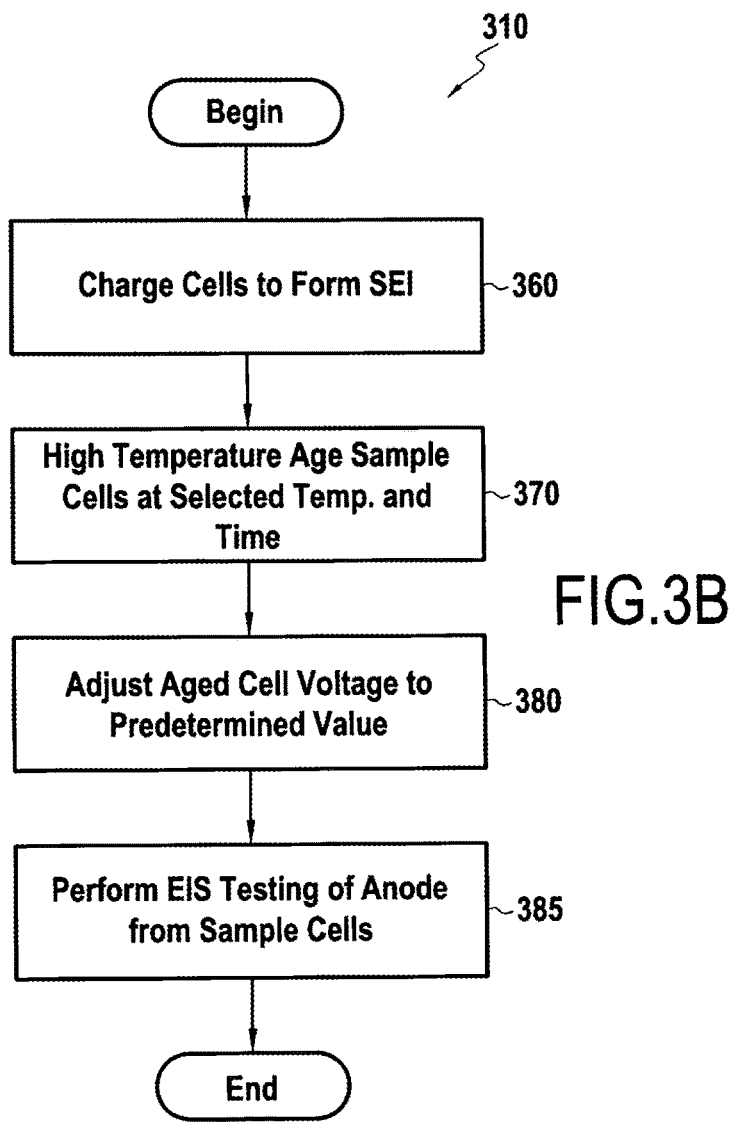
FIG. 3B shows a flowchart illustrating an exemplary method for conducting a test of an exemplary rechargeable cell.

Initially parameters of a desirable temperature and a minimum holding time at the temperature are determined (step 310). FIG. 3B shows a flowchart illustrating an exemplary method for conducting a test of a rechargeable cell 10 in order to determine these parameters, and will be described below.

According to step 360, a formation process of one or more cells 10 having a substantially identical design is carried out by performing an initial charge of the one or more cell resulting in formation of the SEI 24.

Then, in step 370 a high temperature aging process of each of the one or more cells 10 undertaken. For example the cell 10 or at least its anode 12 may be heated, e.g. at 60° C. Each of the cells 10 or anodes 12 may be heated at a different temperature over a different period of time so as to enable testing of a variety of different temperatures and minimum time periods. According to one example, three temperatures with five different time periods at each temperature may be tested. In such an example, 15 cells substantially identically configured cells 10 may be used.

The selected temperatures may be greater than 30° C., and less than 120° C., for example, 40° C., 60° C., and 80° C. The temperature is desirably selected such that an ionic conductivity of the SEI becomes elevated, and desirably increases to a maximum point (i.e., saturation of ionic conductivity). This may depend upon the anode material, the SEI material, the initial charge method resulting in formation of the SEI, among others. Particularly, following a charging process resulting in formation of the SEI, an initial ionic conductivity is exhibited by the SEI. During high temperature aging, the quality (e.g., chemical composition, density, etc.) of the SEI is modified to result in increased ionic conductivity.

The minimum time periods may be between 30 min and 200 hours, particularly between 5 and 80 hours, for example, immediately after charging (0 hours) 20, 40, 60, and 80 hours. The time period for aging at a particular temperature is desirably set to a point at which an ionic conductivity becomes saturated, i.e., does not change substantially from its level at said minimum time.

Figure 4:
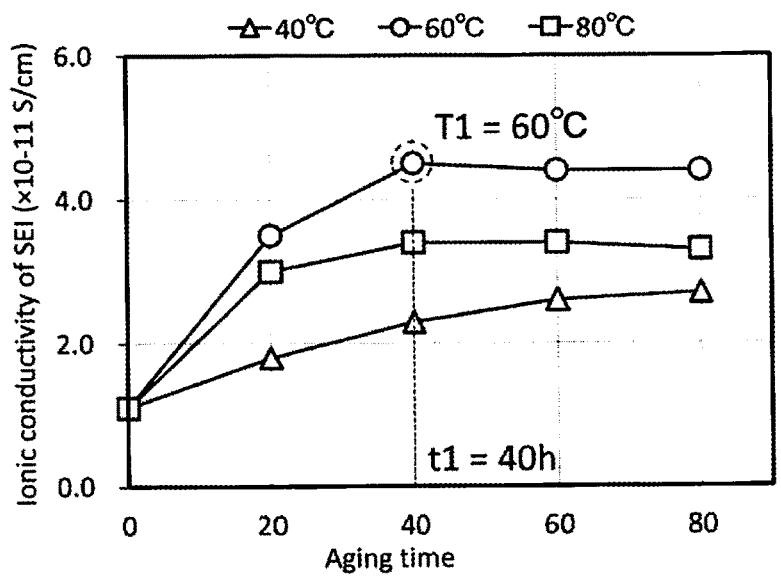
FIG. 4 shows a graph of ionic conductivity evolution over time for an exemplary SEI aging process.

FIG. 4 shows a graph of ionic conductivity evolution over time for the aging process described herein. Taking for example, a predetermined heat aging temperature of 60° C., ionic conductivity saturation occurs at a minimum time of 40 hours. In other words, changes in ionic conductivity beyond 40 hours are relatively small.

In step 380, the cell voltage of each of the batteries is adjusted to a predetermined voltage at a predetermined temperature, for example, 3.7 volts at 25° C. The one or more cells may then be disassembled and anode 12 removed for electrochemical impedance spectroscopy testing in a three-electrode cell (step 385).

The results of the EIS testing may then be used to determine a desirable temperature and minimum time over which the cell design should be temperature aged based on the highest ionic conductivity achieved as a result of the temperature aging. Subsequent cells may then be aged using the time and temperature parameters thus determined (step 320).

EXAMPLES

Fifteen cells 10 having the same components were prepared according to the present disclosure for testing at varying charge rates. These cells were configured as follows:
Cathode: LiNi1/3Co1/3Mn1/3O2;
  conductive material—acetylene black;
  binder—poly vinylidine difluoride (PVDF)
Anode: active material—graphite;
  binder—styrene butadiene rubber (SBR), carboxymethyl cellulose (CMC)
Separator: polyethylene film
Electrolyte: EC:DMC:EMC=1:1:1 by volume with LiPF6 1 mol/L;

SEI-forming additive: Lithium bis (oxalato) borate 0.05 mol/L.

Each of the fifteen cells were then subjected to an identical initial charging process to cause formation of SEI 24 on anode 12.

The fifteen cells were then subjected to a temperature aging process, according to the values shown at Table 1.

TABLE 1

|  | Temperature (° C.) | Aging time (hour) | Ionic conductivity of SEI (×10⁻¹¹ S/cm) |
| --- | --- | --- | --- |
| Sample 1 | 40 | 0 | 1.1 |
| Sample 2 |  | 20 | 1.8 |
| Sample 3 |  | 40 | 2.3 |
| Sample 4 |  | 60 | 2.6 |
| Sample 5 |  | 80 | 2.7 |
| Sample 6 | 60 | 0 | 1.1 |
| Sample 7 |  | 20 | 3.5 |
| Sample 8 |  | 40 | 4.5 |
| Sample 9 |  | 60 | 4.4 |
| Sample 10 |  | 80 | 4.4 |
| Sample 11 | 80 | 0 | 1.1 |
| Sample 12 |  | 20 | 3.0 |
| Sample 13 |  | 40 | 3.4 |
| Sample 14 |  | 60 | 3.4 |
| Sample 15 |  | 80 | 3.3 |

In other words, five of the cells were temperature aged at 40° C., another five cells at 60° C., and another five cells at 80° C., each of these temperatures resulting in an elevated value of ionic conductivity in the SEI formed during an initial charging process.

For each of these temperatures, one of each of the five cells was aged the noted temperature for a different period of time, ranging from immediately after charging (i.e., 0 hours) to 80 hours. The minimum time is desirably at least long enough to result in saturation of ionic conductivity of the SEI, however, for purposes of these examples, a variety of heat aging times were studied.

After the heat aging process, the fifteen cells were disassembled and the anodes 12 removed from the cell, and placed in a three-electrode cell. The three-electrode cell used for purposes of the following testing was configured as follows:
Three-electrode cell: Toyo system Co., model TYS-00DM02D
Working electrode: Anode 12 electrode of tested sample cell
Counter electrode: Li foil
Reference electrode: Li foil
Electrolyte: EC:DMC:EMC=1:1:1 (volume ratio) with LiPF6 1 mol/L A temperature of the three-electrode cell was then placed at −10° C., and an AC voltage of ±5 mV was applied over a frequency range of 100 kHz-10 MHz, and the resulting data captured for each anode 12.

Figure 5:
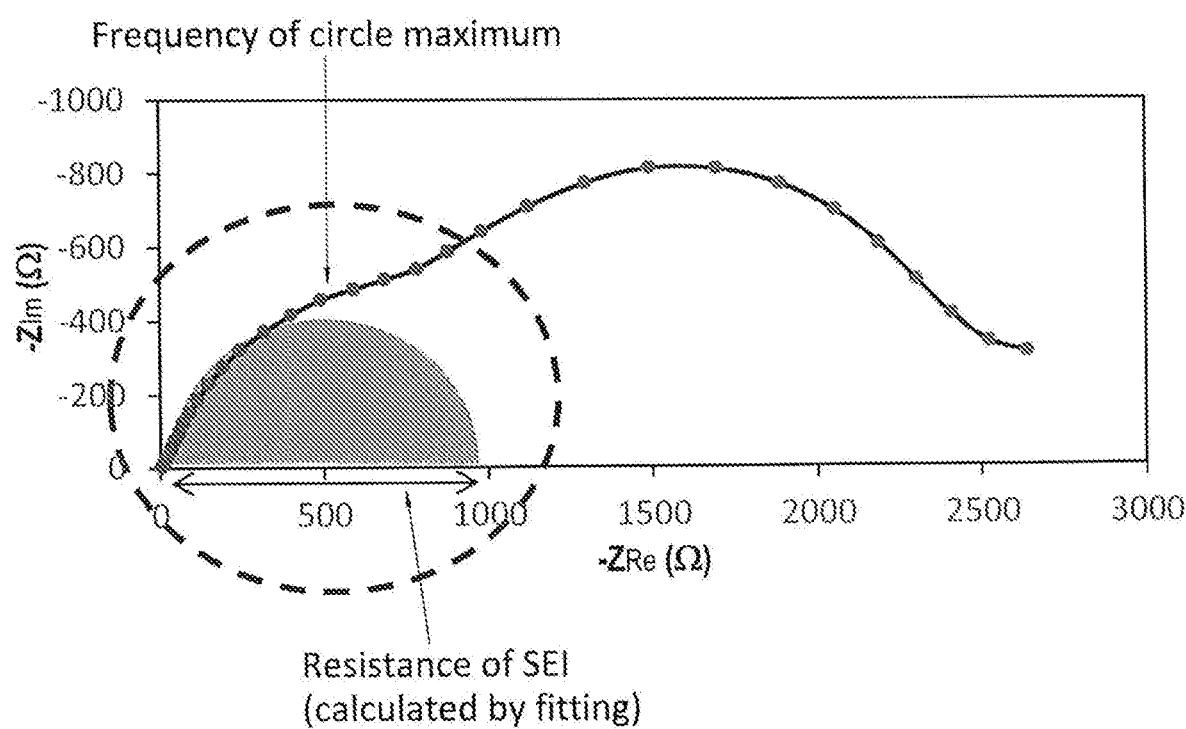
FIG. 5 shows an exemplary graph for determining a resistance of an SEI layer using an exemplary data fitting method.

Resistance ($R_{sei}$) and capacitance ($C_{sei}$) of the SEI were then determined based on electrochemical impedance spectroscopy data fitting using the model described at page 7 second column to page 8, first column, referencing FIGS. 8a-c of the publication Peled, E., "Tissue-like Silicone Nanowires-based 3D Anodes for High-Capacity Lithium Ion Batteries," Nano Letters, May 2015. It is intended that this specific portion of the Nano Letters publication be incorporated herein by reference. In other words, with the resulting data graphed, the semi-circles and their respective diameters were calculated, with the capacity calculated at the frequency of the circle maximum. FIG. 5 shows an exemplary chart where $R_{sei}$ is determined based on the fitting described in this portion of Peled.

Ionic conductivity of the SEI was then be calculated using formula 1)

$$\frac{\varepsilon_0 \times \varepsilon_{sei}}{R_{sei} \times C_{sei}} \text{ s/cm} \quad (1$$

where $\varepsilon_0$ is permittivity of a vacuum and has a value of $8.9 \times 10^{-14}$ F/cm, $\varepsilon_{sei}$ corresponds to a relative permittivity of the solid electrolyte interface (24) and has a value of 10, and where $R_{sei}$ is the determined resistance of the solid electrolyte interface (24) and $C_{sei}$ is the determined capacitance of the solid electrolyte interface (24). See Peled, E., *Journal of The Electrochemical Society* 126.12 (1979): 2047-2051.

Table 1 contains the calculated ionic conductivity for each of the 15 sample cells tested, with the 5 cells treated in the 60° C. having the highest values.

For purposes of the present disclosure, and in order to demonstrate a correlation of ionic conductivity with retention values, as noted by the present inventors, the 15 sample cells were also tested for capacity retention using equation 2 for the determination.

(CR=((First discharge capacity)/(Discharge capacity after cycle test))*100(%)  (2

The cycle test mentioned in equation 11 involves 500 charge/discharge cycles of a cell between 3 volts and 4 volts, at room temperature, where the charge and discharge are each performed at a rate of 2 C.

Table 2 shows the capacity retention values of each of the 15 tested samples.

TABLE 2

|  | Temperature (° C.) | Aging time (hour) | Capacity retention (%) |
| --- | --- | --- | --- |
| Sample 1 | 40 | 0 | 86 |
| Sample 2 |  | 20 | 87 |
| Sample 3 |  | 40 | 88 |
| Sample 4 |  | 60 | 89 |
| Sample 5 |  | 80 | 89 |
| Sample 6 | 60 | 0 | 86 |
| Sample 7 |  | 20 | 91 |
| Sample 8 |  | 40 | 93 |
| Sample 9 |  | 60 | 92 |
| Sample 10 |  | 80 | 91 |
| Sample 11 | 80 | 0 | 86 |
| Sample 12 |  | 20 | 90 |
| Sample 13 |  | 40 | 91 |
| Sample 14 |  | 60 | 90 |
| Sample 15 |  | 80 | 88 |

Comparing the results recorded at Table 2 with those shown at Table 1, the inventors show that as ionic conductivity increases, so too does capacity retention. Therefore, it becomes possible to avoid capacity retention testing, which may take as long as 25-30 days to complete. By contrast, the testing of ionic conductivity using the disclosed method may take approximately one day. Therefore, significant time and cost savings may be achieved.

Throughout the description, including the claims, the term "comprising a" should be understood as being synonymous with "comprising at least one" unless otherwise stated. In addition, any range set forth in the description, including the claims should be understood as including its end value(s) unless otherwise stated. Specific values for described elements should be understood to be within accepted manufacturing or industry tolerances known to one of skill in the art, and any use of the terms "substantially" and/or "approximately" and/or "generally" should be understood to mean falling within such accepted tolerances.

Although the present disclosure herein has been described with reference to particular embodiments, it is to be understood that these embodiments are merely illustrative of the principles and applications of the present disclosure.

It is intended that the specification and examples be considered as exemplary only, with a true scope of the disclosure being indicated by the following claims.

The method is described in terms of a single cell. However, it may be easily adapted for batteries having multiple cells. Moreover it may also refer to other cell types than lithium-ion cells.

The invention claimed is:

1. A method of performing a high-temperature aging process of a rechargeable cell (10) comprising an anode (12) having a solid electrolyte interface (24) formed thereon, a cathode (16), an electrolyte (22), and a separator (20), the method comprising:
   determining a minimum period of time and a temperature at which an ionic conductivity of the solid electrolyte interface (24) becomes saturated;
   heating the solid electrolyte interface (24) to the temperature; and
   holding the solid electrolyte interface (24) at the temperature for the minimum period of time.

2. The method according to claim 1, comprising charging the rechargeable cell prior to the heating, to cause formation of the solid electrolyte interface (24).

3. The method according to claim 1, comprising
   providing an SEI-forming additive selected from among an oxalate salt, an ethylene carbonate and a sulfone, to the electrolyte (22).

4. The method according to claim 1, wherein the method is performed for completion of the lithium-ion cell (10) after a first charging of the cell.

5. The method according to claim 1, wherein the ionic conductivity of the solid electrolyte interface (24) is calculated as $$\frac{\varepsilon_0 \times \varepsilon_{sei}}{R_{sei} \times C_{sei}} \text{ s/cm}$$

where $\varepsilon_0$ is permittivity of a vacuum and has a value of $8.9 \times 10^{-14}$ F/cm, $\varepsilon_{sci}$ corresponds to a relative permittivity of the solid electrolyte interface (24) and has a value of 10, and where $R_{sei}$ is a resistance of the solid electrolyte interface (24) and $C_{sei}$ is a capacitance of the solid electrolyte interface (24), each of $R_{sei}$ and $C_{sei}$ being measured via electrochemical impedance spectroscopy.

6. The method according to claim 1, wherein the temperature is greater than 30° C., and less than 100° C.

7. The method according to claim 1, wherein the minimum period of time ranges between 30 min and 200 hours.

8. The method according to claim 1, comprising disassembling the cell (10) and conducting an EIS analysis of the anode (12).

9. A vehicle comprising a rechargeable cell (10) according to claim 1.

10. The method according to claim 1, wherein the temperature which is 60° C.

11. The method according to claim 1, wherein the minimum period of time ranges between 5 and 80 hours.

12. The method according to claim 1, wherein the minimum period of time is approximately 40 hours.

* * * * *